US011404701B2

(12) United States Patent
Martinez Bonastre et al.

(10) Patent No.: US 11,404,701 B2
(45) Date of Patent: *Aug. 2, 2022

(54) CATALYST

(71) Applicant: Johnson Matthey Fuel Cells Limited, London (GB)

(72) Inventors: Alejandro Martinez Bonastre, Reading (GB); Geoffrey Hugh Spikes, Reading (GB); Rachel Louise O'Malley, Buckinghamshire (GB)

(73) Assignee: Johnson Matthey Fuel Cells Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,788

(22) Filed: Oct. 6, 2020

(65) Prior Publication Data

US 2021/0020953 A1 Jan. 21, 2021

Related U.S. Application Data

(63) Continuation of application No. 16/072,946, filed as application No. PCT/GB2017/050202 on Jan. 26, 2017, now Pat. No. 10,833,334.

(30) Foreign Application Priority Data

Jan. 29, 2016 (GB) ..................... 1601673

(51) Int. Cl.
| | | |
|---|---|---|
| H01M 4/88 | (2006.01) | |
| H01M 4/92 | (2006.01) | |
| H01M 4/90 | (2006.01) | |
| H01M 8/1004 | (2016.01) | |
| H01M 8/10 | (2016.01) | |

(52) U.S. Cl.
CPC ......... *H01M 4/8882* (2013.01); *H01M 4/885* (2013.01); *H01M 4/8892* (2013.01); *H01M 4/9016* (2013.01); *H01M 4/9041* (2013.01); *H01M 4/921* (2013.01); *H01M 4/925* (2013.01); *H01M 8/1004* (2013.01); *H01M 2008/1095* (2013.01)

(58) Field of Classification Search
CPC ... B01J 23/40; B01J 23/48; B01J 23/60; B01J 23/626; B01J 23/648; B01J 23/6522; H01M 4/8882; H01M 4/885; H01M 4/9016; H01M 4/9041; H01M 4/921; H01M 4/925; H01M 8/1004
USPC ....... 502/300, 326, 329, 331, 337–339, 349, 502/350, 353; 420/466
See application file for complete search history.

(56) References Cited

U.S. PATENT DOCUMENTS

| | | | |
|---|---|---|---|
| 3,380,934 A | 4/1968 | Batzold | |
| 4,192,907 A | 3/1980 | Jalan et al. | |
| 6,232,264 B1 | 5/2001 | Lukehart et al. | |
| 7,422,994 B2 | 9/2008 | Chondroudis et al. | |
| 7,659,224 B2 | 2/2010 | Shimazaki et al. | |
| 9,647,275 B2 | 5/2017 | Serov et al. | |
| 10,833,334 B2* | 11/2020 | Martinez Bonastre | ..................... H01M 8/1004 |
| 2003/0073575 A1 | 4/2003 | Gorer | |
| 2006/0116285 A1 | 6/2006 | Cao et al. | |
| 2009/0136816 A1 | 5/2009 | Kang et al. | |
| 2009/0311568 A1 | 12/2009 | Yamada | |
| 2009/0317289 A1 | 12/2009 | Ito et al. | |
| 2010/0099012 A1 | 4/2010 | Adzic | |
| 2011/0097650 A1 | 4/2011 | Lin et al. | |
| 2011/0245073 A1 | 10/2011 | Oljaca et al. | |
| 2011/0294658 A1 | 12/2011 | Lefevre et al. | |
| 2015/0093686 A1 | 4/2015 | Serov et al. | |
| 2015/0147681 A1 | 5/2015 | Serov et al. | |

FOREIGN PATENT DOCUMENTS

| | | | | |
|---|---|---|---|---|
| CN | 1783558 | * | 6/2006 | .............. B01J 37/00 |
| CN | 1783558 A | | 6/2006 | |
| EP | 0330627 A1 | | 8/1989 | |
| EP | 0631337 A2 | | 12/1994 | |
| GB | 606348 | | 8/1948 | |
| JP | 2003036859 A | | 2/2003 | |
| JP | 2007324092 A | | 12/2007 | |
| JP | 2011181359 A | | 9/2011 | |
| WO | 00/24074 A1 | | 4/2000 | |
| WO | 2006112368 A1 | | 10/2006 | |
| WO | 2012/080726 A1 | | 6/2012 | |

(Continued)

OTHER PUBLICATIONS

Vibin Vargheese et al., "A New One-Pot Sequential Reduction-Deposition Method for the synthesis of Silica-supported NIPt and CuPt Bimetallic Catalysts." Applied Catalysis A, General 591, pp. 1-14. (Year: 2020).

Junchao Huang, Zhaolin Liu, Chaobin He, and, and Leong Ming Gan, Synthesis of PtRu Nanoparticles from the Hydrosilylation Reaction and Application as Catalyst for Direct Methanol Fuel Cell, The Journal of Physical Chemistry B 2005 109 (35), pp. 16644-16649.

PCT/GB/2017/050202 International Search Report and Written Opinion dated Mar. 8, 2017.

Takenaka et al., "Preparation of supported Pt—Co alloy nanoparticle catalysts for the oxygen reduction reaction by coverage with silica", Journal of Catalysis 274 (2010) 228-238.

*Primary Examiner* — Patricia L. Hailey
(74) *Attorney, Agent, or Firm* — BakerHostetler

(57) ABSTRACT

A process for preparing a catalyst material, said catalyst material comprising a support material, a first metal and one or more second metals, wherein the first metal and the second metal(s) are alloyed and wherein the first metal is a platinum group metal and the second metal(s) is selected from the group of transition metals and tin provided the second metal(s) is different to the first metal is disclosed. The process comprises depositing a silicon oxide before or after deposition of the second metal(s), alloying the first and second metals and subsequently removing silicon oxide. A catalyst material prepared by this process is also disclosed.

27 Claims, No Drawings

(56) References Cited

FOREIGN PATENT DOCUMENTS

| WO | 2013/045894 A1 | 4/2013 |
|---|---|---|
| WO | 2015177542 A1 | 11/2015 |
| WO | 2017/129982 A1 | 8/2017 |

* cited by examiner

CATALYST

CROSS-REFERENCE TO RELATED APPLICATIONS

The present application is a continuation of U.S. Ser. No. 16/072,946, filed Jul. 26, 2018, which is the National Stage of International Patent Application No. PCT/GB2017/050202, filed Jan. 26, 2017, which claims priority to Great Britain Patent Application No. 1601673.5, filed Jan. 29, 2016, the entire contents of each of which are hereby incorporated by reference.

FIELD OF THE INVENTION

The present invention relates to a process for preparing a catalyst material comprising a first metal alloyed with one or more second metal and the product prepared by such a process.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the membrane is proton conducting, and protons, produced at the anode, are transported across the membrane to the cathode, where they combine with oxygen to form water.

A principal component of the PEMFC is the membrane electrode assembly (MEA), which is essentially composed of five layers. The central layer is the polymer ion-conducting membrane. On either side of the ion-conducting membrane there is an electrocatalyst layer, containing an electrocatalyst designed for the specific electrocatalytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

Electrocatalysts for fuel oxidation and oxygen reduction are typically based on platinum or platinum alloyed with one or more other metals. The platinum or platinum alloy catalyst can be in the form of unsupported nanoparticles (such as metal blacks or other unsupported particulate metal powders) or can be deposited as even higher surface area particles onto a conductive carbon substrate or other conductive material (a supported catalyst).

Conventionally, the MEA can be constructed by a number of methods outlined hereinafter: (i) The electrocatalyst layer may be applied to the gas diffusion layer to form a gas diffusion electrode. A gas diffusion electrode is placed on each side of the ion-conducting membrane and laminated together to form the five-layer MEA;

(ii) The electrocatalyst layer may be applied to both faces of the ion-conducting membrane to form a catalyst coated ion-conducting membrane. Subsequently, a gas diffusion layer is applied to each face of the catalyst coated ion-conducting membrane.

(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically, tens or hundreds of MEAs are required to provide enough power for most applications, so multiple MEAs are assembled to make up a fuel cell stack. Flow field plates are used to separate the MEAs. The plates perform several functions: supplying the reactants to the MEAs; removing products; providing electrical connections; and providing physical support.

Electrocatalysts for fuel oxidation and oxygen reduction reactions are typically based on platinum or platinum alloyed with one or more metals. The platinum or platinum alloy catalyst can be in the form of unsupported nanometre sized particles (for example metal blacks) or can be deposited as discrete very high surface area nanoparticles onto a support material (a supported catalyst). Electrocatalysts can also be in the form of coatings or extended films deposited onto a support material. There is a continual search for catalysts, particularly oxygen reduction reaction catalysts, that have improved activity and/or stability, and that therefore utilise the expensive platinum catalyst more effectively. This enables the MEA performance to be increased or the loading (and therefore cost) of the catalyst employed in the MEA to be decreased, or a combination of both benefits.

A wide range of catalyst concepts have been investigated over the past 15 years for improved oxygen reduction activity. Alloying Pt with base metals such as Co, Ni, Cu, Cr and Ti has been shown to increase the surface specific activity of the active Pt catalyst sites, due to either a change in the Pt—Pt inter-atomic distance or to lattice strain causing a shift in the d-band position. In some approaches to alloy catalyst preparation highly Pt-rich surfaces can be formed. In these so-called Pt-skin catalysts more of the Pt is available at the surface of the particle for the oxygen reduction reaction, whereas the base metal is more concentrated in the core of the particle. This provides for a higher mass specific activity of the Pt in addition to any positive impact on the surface specific activity of the Pt caused by the underlying base metal component of the alloy in the particle. Other recent developments include Pt-skeleton surfaces, where aggressive leaching processes remove much of the base metal component to leave a more open and porous Pt nanoparticle. In another approach a thin film of Pt or an alloy can be deposited onto a support by physical vapour deposition techniques to form continuous extended thin films of Pt rather than discrete nanoparticles. Materials such as the nanostructured thin film (NSTF) catalysts have high specific activity and corrosion stability. A further class of high activity Pt alloy nanoparticle catalysts reported in recent years is that of the de-alloyed Pt-M concept—materials obtained by the synthesis of highly base-metal (M) rich alloy nanoparticles which are subjected to a selective leaching process of the less noble metal form the particle surface. The resulting platinum-rich surface of the de-alloyed electrocatalyst particles exhibit compressive strain which, via electronic effects, leads to a highly active oxygen reduction reaction catalyst. An important requirement for all these catalysts is a high surface area of the active Pt species, in order to achieve the highest possible kinetic activity. In addition, it has been proposed that higher surface areas of the active metal species in alloy catalysts is also necessary to help achieve satisfactory MEA performances under high current density practical operating conditions, as the loading of the Pt catalyst at the cathode of an MEA is reduced to economically viable levels of around 0.1 mgcm$^{-2}$. In these circumstances, it has been reported that oxygen transport mechanisms to the catalyst sites can be compromised if there is insufficient active catalyst species surface area. In the formation of Pt alloy nanoparticle catalysts, high temperature annealing processes are invariably employed, which cause the formation of larger nanoparticles (typically >5 nm) of lower surface area, compared to non-annealed pure Pt catalysts which often have particle sizes of 2-3 nm. As well as the need for high kinetic activity and MEA performance, it is also important that the catalysts are stable in operation and therefore capable of retaining the high activity throughout the lifetime of their application in the fuel cell. Various mechanisms such as nanoparticle migration over the support surface; Pt dissolution and re-precipitation; and underlying support corrosion are known to increase the nanoparticle size during operation and lead to a gradual, but continuous reduction in activity. Therefore, there remains a need to design further improved catalysts to enable either the enhancement of the intrinsic kinetic activity, the performance of the catalysts in the MEA or the stability of the catalyst.

SUMMARY OF THE INVENTION

It is therefore the object of the present invention to provide a process for preparing an improved alloy catalyst having an increased surface area of the active metal, and improved performance obtained when the catalyst is incorporated into an MEA.

The invention provides a process for preparing a catalyst material, said catalyst material comprising a support material, a first metal and one or more second metals, wherein the first metal and the second metal(s) are alloyed and wherein the first metal is a platinum group metal and the second metal(s) is selected from the group of transition metals and tin provided the second metal(s) is different to the first metal, said process comprising the steps:

(i) providing a catalyst material precursor comprising the first metal supported on the support material;

(ii) depositing a silicon oxide precursor and one or more second metal precursors on the catalyst material precursor;

(iii) carrying out a first heat treatment step to convert the silicon oxide precursor to silicon oxide;

(iv) carrying out a second heat treatment step to alloy the first metal and the second metal(s); and (v) removal of at least some of the silicon oxide to form the catalyst material.

The invention further provides a catalyst material obtainable by the process of the invention.

The invention further provides a cathode catalyst material for a fuel cell comprising a support material, a first metal and one or more second metals, wherein the first metal and the second metal(s) are alloyed and wherein the first metal is a platinum group metal (preferably platinum) and the second metal(s) is selected from the group consisting of nickel, cobalt, chromium, palladium, iridium, copper, iron or zinc, provided the first metal and second metal(s) are not the same, characterised in that the atomic ratio of first metal to total second metal(s) is ≥1 and ≤5 and the metal area of the catalyst material, as measured by gas phase carbon monoxide (CO) chemisorption, is at least 56 m$^2$/g of the platinum group metal components.

The invention further provides the use of a catalyst material comprising a support material, a first metal and one or more second metals, wherein the first metal and the second metal(s) are alloyed and wherein the first metal is a platinum group metal (preferably platinum) and the second metal(s) is selected from the group consisting of nickel, cobalt, chromium, palladium, iridium, copper, iron or zinc, provided the first metal and the second metal(s) are not the same, characterised in that the atomic ratio of first metal to total second metal(s) is ≥1 and ≤5 and the metal area of the catalyst material, as measured by gas phase carbon monoxide (CO) chemisorption, is at least 56 m$^2$/g of the platinum group metal components at the cathode of a fuel cell.

The invention further provides an anode catalyst material for a fuel cell comprising a support material, a first metal and one or more second metals, wherein the first metal and the second metal(s) are alloyed and wherein the first metal is a platinum group metal (preferably platinum) and the second metal(s) is selected from the group consisting of osmium, ruthenium, niobium, tantalum, vanadium, iridium, tin, titanium or rhodium, provided that the first metal and the second metal(s) are not the same, characterised in that the atomic ratio of first metal to total second metal(s) is greater than ≥0.5 and ≤6 and the metal area of the catalyst material, as measured by gas phase carbon monoxide chemisorption, is at least 18 m$^2$/g, and preferably at least 30 m$^2$/g, of platinum group metal components.

The invention further provides the use of a catalyst material comprising a support material, a first metal and one or more second metals, wherein the first metal and the second metal(s) are alloyed and wherein the first metal is a platinum group metal and the second metal(s) is selected from the group consisting of osmium, ruthenium, niobium, tantalum, vanadium, iridium, tin, titanium or rhodium, provided that the first metal and the second metal(s) are not the same, characterised in that the atomic ratio of first metal to total second metal(s) is greater than ≥0.5 and ≤6 and the metal area of the catalyst material, as measured by gas phase carbon monoxide chemisorption, is at least 18 m$^2$/g of platinum group metal components at the anode of a fuel cell.

DETAILED DESCRIPTION OF THE INVENTION

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

The invention provides a process for preparing a catalyst material, said catalyst material comprising a support material, a first metal and one or more second metals, wherein the first metal and the second metal(s) are alloyed and wherein the first metal is a platinum group metal and the second metal(s) is selected from the group of transition metals different to the first metal, said process comprising the steps:

(i) providing a catalyst material precursor comprising the first metal supported on the support material;

(ii) depositing a silicon oxide precursor and one or more second metal precursors on the catalyst material precursor;

(iii) carrying out a first heat treatment step to convert the silicon oxide precursor to silicon oxide;

(iv) carrying out a second heat treatment step to alloy the first metal and the second metal(s); and (v) removal of at least some of the silicon oxide to form the catalyst material.

In step (ii), the silicon oxide precursor is deposited prior to the second metal precursor(s). Alternatively, in step (ii) the second metal precursor(s) are deposited prior to the silicon oxide precursor.

Alternatively, if the catalyst material comprises two or more second metals each second metal having a second metal precursor, in step (ii) each second metal precursor can be independently deposited either before or after the silicon oxide precursor.

Optionally, an additional step (vi) is carried out:

(vi) removal of some or all of any unalloyed second metal(s) and/or removal of a portion of alloyed second metal(s) from the surface of the catalyst material (to provide a de-alloyed catalyst material).

First Metal

The first metal is a platinum group metal and is one or more metals selected from the group platinum, ruthenium, palladium, rhodium, iridium and osmium. Preferably, the first metal is platinum.

Second Metal

The one or more second metals are transition metals or tin. The second metal(s) are different to the first metal. The choice of second metal(s) will depend on the final use of the catalyst and it is within the ability of the skilled person to select an appropriate second metal(s). Suitably, the second metal(s) is selected from the group consisting of precious metals other than platinum (i.e. ruthenium, rhodium, palladium, osmium, iridium, gold, silver) and base metals (e.g. nickel, cobalt, chromium, copper, iron, zinc, niobium, tantalum, vanadium, tin or titanium).

If the catalyst material is for use at the cathode, the second metal(s) is suitably selected from the group of nickel, cobalt, chromium, palladium, iridium, copper, iron or zinc.

If the catalyst material is for use at the anode, the second metal(s) is suitably selected from the group consisting of osmium, ruthenium, niobium, tantalum, vanadium, iridium, tin, titanium or rhodium.

Support Material The support material is either fibrous or particulate in morphology.

The particulate support material may be a carbon particle, for example, a commercially available carbon black (such as furnace blacks available form Cabot Corporation. (Vulcan® XC72R) and AkzoNobel (Ketjen Black series)) or a graphitised or modified version of these carbon blacks or other commercially available carbon blacks such as acetylene blacks (e.g. those available from Denka Co., Ltd). The carbon may also be one specifically designed for use in a fuel cell, such as those described in WO2013/045894. Alternatively, the particulate may be a metal oxide (e.g. titania, zirconia, silica or a mixed oxide, in particular a conductive mixed oxide such as niobia-doped titania, phosphorus-doped tin oxide and mixed platinum group metal oxides or mixed metal oxides as disclosed in WO2012/080726), a carbide (e.g. tungsten carbide or titanium carbide), a nitride, in particular a conductive nitride (e.g. titanium nitride or titanium aluminium nitride).

The fibrous support material is suitably made from carbon (e.g. made from a carbonisable polymer, such as polyacrylonitrile, polyimide, cellulose), a polymer (e.g. polybenzimidazole, polyimide, polytetrafluoroethylene (PTFE)) a metal oxide (e.g. a conductive mixed metal oxide (e.g. as disclosed in WO2012/080726), a metal nitride (e.g. a conductive nitride, such as titanium nitride), a metal carbide (e.g. a conductive metal carbide, such as tungsten carbide, titanium carbide) or a metal. These fibres may be produced by electrospinning, force spinning, rotary jet spinning, metal spinning and other conventional techniques known to those skilled in the art for making fibres. Suitably, the fibre support material has a length greater than 0.5 µm, more suitably 1 µm, preferably 3 µm and a high aspect ratio. The maximum length of the fibres will be dependent on the nature of the fibre and the process by which it is produced. By 'high aspect ratio' is meant the length is considerably greater (for example at least 6 times, suitably at least 15 times and preferably at least 30 times) than the cross-sectional dimensions. Suitably the maximum cross-sectional dimension (diameter) of the fibrous support material is 500 nm, suitably 200 nm and preferably 100 nm.

Step (i): Catalyst Material Precursor

The starting material for the process of the invention is a first metal supported on the support material. Preparation of such a material is well known to the skilled person and could be carried out by a number of different methods, for example as described in WO2013/045894.

Step (ii): Silicon Oxide Precursor

The silicon oxide precursor is any compound which is able to be converted to silicon oxide during the first heat treatment step.

The silicon oxide precursor may be a siloxane compound, i.e. a compound having a Si—O—Si linkage. The siloxane may be formed by reaction of one or more alkoxysilanes (such as (3-aminopropyl)triethoxysilane (APTES) and tetraethylorthosilicate (TEOS)).

Alternatively, the siloxane compound is formed from a silazane, chlorosilane or dimethylaminosilane.

Second Metal Precursor

The one or more second metal precursors are suitably selected from the group consisting of a nitrate, halide, carboxylate, alkoxide and sulphate of the one or more second metals. Suitably, the second metal precursor(s) is selected from the group consisting of a nitrate, halide and carboxylate of the second metal(s).

The silicon oxide precursor and the second metal precursor(s) are deposited on the catalyst material precursor.

The silicon oxide precursor is deposited prior to the second metal precursor(s); this is particularly the case in which the second metal precursor(s) is soluble in basic or acidic conditions, but may also be for examples in which the second metal precursor(s) is not soluble in basic or acidic conditions.

Alternatively, if the second metal precursor(s) is not soluble in basic or acidic conditions, the second metal precursor(s) may be deposited prior to the silicon oxide precursor.

Alternatively, where there are two or more second metals, each second metal precursor can be independently deposited either before or after the silicon oxide precursor deposition.

To deposit the silicon oxide precursor, the catalyst material precursor is dispersed in acidic or basic, aqueous or ethanolic solution. In a preferred embodiment the solution has a pH>8. A particularly suitable solution is aqueous ammonia solution. The compounds required to provide the silicon oxide precursor (e.g. APTES and TEOS) are added into the dispersion of the catalyst material precursor and mixed for the required time before the product is filtered, washed and dried.

To deposit the second metal precursor(s), the second metal precursor(s) are dispersed into an aqueous solution, and this aqueous solution is impregnated into the catalyst material precursor or the catalyst material precursor with silicon oxide precursor deposited thereon and mixed to ensure a homogeneous solution.

Step (iii): First Heat Treatment Step

The first heat treatment step enables the conversion of the silicon oxide precursor to silicon oxide.

The first heat treatment step is carried out in a reductive atmosphere, for example under hydrogen, a mixture of hydrogen and an inert gas, or an inert gas using carbon to provide the reductive atmosphere; preferably the heat treatment step is carried out under hydrogen diluted with inert gas.

The first heat treatment step is carried out at a temperature in the range of 250° C. to 500° C.; preferably 290° C. to 400° C.

Step (iv): Second Heat Treatment Step

The second heat treatment step enables alloying of the first metal and the second metal(s). The term 'alloying' is intended to indicate that all of the first and second metal components are combined to form an alloy; however, it is possible that there may be some residual first and/or second metal(s) remaining unalloyed in the final catalyst of the invention, (e.g. up to 10 weight % of each of the first and/or second metal(s)).

The second heat treatment step is also carried out in a reductive atmosphere as described above in relation to the first heat treatment step.

The second heat treatment step is carried out at a temperature in the range of 350° C. to 1000° C.; suitably in the range 400° C. to 900° C. The temperature required to form an alloy of the first metal and second metal(s) will depend on the first and second metals and the selection of a suitable temperature is within the ability of the skilled person.

The second heat treatment step is carried out a temperature higher than that for the first heat treatment step.

Suitably, a single sequential process is employed for the heat treatment steps, with the second heat treatment step being a continuation of the first heat treatment step, with simply an increase in the temperature, with no cooling stage between the heat treatment steps being undertaken. Alternatively, the first heat treatment step and the second heat treatment step are separate process steps and wherein there may be a cooling stage after the first heat treatment process step.

Step (v): Removal of Silicon Oxide

Silicon oxide is not an essential requirement for the final catalyst material, although small amounts of silicon oxide are not detrimental and in fact, may lead to improved performance of the resulting MEA under some conditions of operation. Thus, step (v) removes most, if not all, of the silicon oxide from the alloy catalyst on the support material. The silicon oxide is removed using a fluorination or hydrolysation process, preferably using a basic solution, such as a hydroxide solution, and in particular tetraethylammonium hydroxide. Up to 5 wt %, suitably up to 4 wt %, more suitably up to 2 wt % and even more suitably up to 1 wt % of silicon with respect to the weight of the final catalyst material can remain in the catalyst material after the basic treatment. In some embodiments essentially all the silicon oxide is removed with ≥0% but <1%, suitably <0.5 wt % silicon oxide remaining in the catalyst material.

Step (vi): Removal of Second Metal

An optional process step involves washing the catalyst material in acid, which removes any unalloyed second metal(s). Without wishing to be bound by theory, the present inventors believe that the silicon oxide precursor and/or the silicon oxide prevents the second metal(s) from penetrating deep into the pores of the support material resulting in easier removal of any unalloyed second metal(s).

In addition, an acid wash can remove alloyed second metal(s) from the surface of the alloyed catalyst material, giving an alloy in which the surface lattice is depleted of second metal(s) (to form a so-called 'de-alloyed catalyst').

The invention further provides a catalyst material obtainable by the process according to the invention.

The catalyst materials prepared by the process of the present invention have one or more improved properties over similar prior art catalysts, such as improved metal area, and when incorporated into a MEA, the MEA demonstrates improved performance particularly at high current densities and/or under dry conditions.

Thus, a further aspect of the invention provides a cathode catalyst material comprising a support material, a first metal and one or more second metals, wherein the first metal and the second metal(s) are alloyed and wherein the first metal is a platinum group metal (preferably platinum) and the second metal(s) is selected from the group consisting of nickel, cobalt, chromium, palladium, iridium, copper, iron or zinc, provided the first metal and second metal(s) are not the same, characterised in that the atomic ratio of first metal to total second metal(s) is ≥1; suitably the atomic ratio of the first metal to total second metal(s) is ≤5. The metal area of the catalyst material, as measured by gas phase CO chemisorption, is at least 56 $m^2/g$ of the platinum group metal components, and suitably at least 60 $m^2/g$ of the platinum group metal components. Optionally, the cathode catalyst material may contain up to 5 wt %, suitably up to 4 wt %, more suitably up to 2 wt % and even more suitably up to 1 wt % of silicon with respect to the weight of the catalyst material.

A still further aspect of the invention provides an anode catalyst material comprising a support material, a first metal and one or more second metal(s), wherein the first metal and the second metal(s) are alloyed and wherein the first metal is a platinum group metal (suitably platinum) and the second metal(s) is selected from the group consisting of osmium, ruthenium, niobium, tantalum, vanadium, iridium, tin, titanium or rhodium, provided that the first metal and the second metal(s) are not the same, characterised in that the atomic ratio of first metal to total second metal(s) is ≥0.5; suitably the atomic ratio of the first metal to total second metal(s) is ≤6. The metal area of the catalyst material, as measured by gas phase CO chemisorption, is at least 18 $m^2/g$ of the platinum group metal components, and suitably at least 30 $m^2/g$ of the platinum group metal components. Optionally, the anode catalyst material may contain up to 5 wt %, suitably up to 4 wt %, more suitably up to 2 wt % and even more suitably up to 1 wt % of silicon with respect to the weight of the catalyst material.

The metal area is determined by reducing a sample of the catalyst material, in its as-made form, prior to incorporation into an electrode or MEA, in hydrogen, then titrating aliquots of carbon monoxide gas until the active metal surface is saturated with a chemisorbed CO monolayer, and there is no more uptake. The moles of CO chemisorbed can then be converted into a metal surface area, by assuming $1.25 \times 10^{19}$ atoms/$m^2$ for Pt as defined in 'Catalysis—Science and Technology, Vol. 6, p257, Eds J. R. Anderson and M. Boudart. A high Pt surface area determined by this method is well known to translate to a high electrochemical surface area when the catalyst is incorporated into an electrode or MEA and evaluated under fuel cell testing conditions.

The catalysts of the invention have particular use in a catalyst layer, for example for use in a gas diffusion electrode of an electrochemical cell, such as a fuel cell, in particular a PEMFC, or in a catalyst coated ion-conducting membrane of a PEMFC. Thus, there is further provided a catalyst layer comprising the catalyst material of the invention. Furthermore, there is provided the use of the catalyst material of the invention at either the anode or the cathode of a fuel cell.

The catalyst layer may comprise additional components. Such components include, but are not limited to: an ion-conducting polymer, such as a proton conducting polymer, included to improve the ionic conductivity within the layer; an oxygen evolution catalyst; a hydrogen peroxide decomposition catalyst; a hydrophobic additive (e.g. a polymer such as polytetrafluoroethylene (PTFE) or an inorganic solid with or without surface treatment) or a hydrophilic additive (e.g. a polymer of an inorganic solid, such as an oxide) to control reactant and water transport characteristics. The choice of additional components will depend on whether the catalyst layer is for use at the anode or the cathode and it is within the capability of the skilled person to determine which additional components are appropriate.

To prepare the catalyst layer, the catalyst material of the invention and any additional components are dispersed in an aqueous and/or organic solvent to prepare a catalyst ink. If required, particle break-up is carried out by methods known in the art, such as high shear mixing, milling, ball milling, passing through a microfluidiser etc. or a combination thereof, to achieve uniformity of particle size.

After preparation of the catalyst ink, the ink is deposited onto a substrate (e.g. gas diffusion layer, ion-conducting membrane or a carrier/transfer substrate) to form the catalyst layer. The ink may be deposited by any suitable technique known to those in the art, including but not limited to gravure coating, slot die (slot, extrusion) coating, screen printing, rotary screen printing, inkjet printing, spraying, painting, bar coating, pad coating, gap coating techniques such as knife or doctor blade over roll, and metering rod application.

The characteristics of the catalyst layer, such as the thickness, electrocatalyst loading, porosity, pore size distribution, average pore size and hydrophobicity will depend on whether it is being used at the anode or cathode.

If for use at the anode, the catalyst layer thickness is suitably $\geq 1$ µm; more suitably $\geq 2$ µm; preferably $\geq 5$ µm. If for use at the anode, the catalyst layer is suitably $\leq 15$ µm; more suitably $\leq 10$ µm.

If for use at the cathode, the catalyst layer is suitably $\geq 2$ µm; preferably $\geq 5$ µm. If for use at the cathode, the catalyst layer is suitably $\leq 20$ µm; more suitably $\leq 15$ µm.

The loading of platinum from the electrocatalyst in the catalyst layer will depend on whether it is being used at the anode or cathode.

If for use at the anode, the loading of the platinum in the catalyst layer is from 0.02 to 0.2 $mgPt/cm^2$, suitably from 0.02 to 0.15 $mgPt/cm^2$ and preferably from 0.02 to 0.1 $mgPt/cm^2$.

If for use at the cathode, the loading of the platinum in the catalyst layer is from 0.05 $mgPt/cm^2$ to 0.4 $mgPt/cm^2$, suitably from 0.05 to 0.3 $mgPt/cm^2$ and preferably from 0.1 to 0.2 $mgPt/cm^2$.

The catalyst layer may be deposited onto a gas diffusion layer to form a gas diffusion electrode. Thus, a further aspect of the invention provides a gas diffusion electrode comprising a gas diffusion layer and a catalyst layer of the invention. The gas diffusion layers are suitably based on conventional gas diffusion substrates. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc.), or woven carbon cloths. The carbon paper, web or cloth may be provided with a pre-treatment prior to fabrication of the electrode and being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE).

Alternatively, the catalyst layer is deposited onto an ion-conducting membrane, either by direct coating of a catalyst ink onto the membrane, or indirectly by transfer from a carrier or transfer substrate, to form a catalysed membrane. Thus, a further aspect of the invention provides a catalysed membrane comprising an ion-conducting membrane and a catalyst layer of the invention. The ion-conducting membrane may be any membrane suitable for use in a PEMFC, for example the membrane may be based on a perfluorinated sulphonic acid material such as Nafion™ (Chemours Company), Aquivion® (Solvay Specialty Polymers), Flemion® (Asahi Glass Group) and Aciplex™ (Asahi Kasei Chemicals Corp.). Alternatively, the membrane may be based on a sulphonated hydrocarbon membrane such as those available from FuMA-Tech GmbH as the Fumapem® P, E or K series of products, JSR Corporation, Toyobo Corporation, and others. Alternatively, the membrane may be based on polybenzimidazole doped with phosphoric acid which will operate in the range 120° C. to 180° C.

The ion-conducting membrane component may comprise one or more materials that confer mechanical strength to the ion-conducting membrane component. For example, the ion-conducting membrane component may contain a porous reinforcing material, such as an expanded PTFE material or a nanofibre network.

The ion-conducting membrane may comprise one or more hydrogen peroxide decomposition catalysts either as a layer on one or both faces of the membrane, or embedded within the membrane, either uniformly dispersed throughout or in a layer. Examples of the hydrogen peroxide decomposition catalyst suitable for use are known to those skilled in the art and include metal oxides, such as cerium oxides, manganese oxides, titanium oxides, beryllium oxides, bismuth oxides, tantalum oxides, niobium oxides, hafnium oxides, vanadium oxides and lanthanum oxides; suitably cerium oxides, manganese oxides or titanium oxides; preferably cerium dioxide (ceria).

The ion-conducting membrane component may optionally comprise a recombination catalyst, in particular a catalyst for the recombination of unreacted H2 and 02, that can diffuse into the membrane from the anode and cathode respectively, to produce water. Suitable recombination catalysts comprise a metal (such as platinum) on a high surface area oxide support material (such as silica, titania, zirconia). More examples of recombination catalysts are disclosed in EP0631337 and WO00/24074.

When the catalyst layer is deposited onto a carrier/transfer substrate, by coating of a catalyst ink onto the carrier/transfer substrate, it forms a catalysed carrier/transfer substrate. Thus, an alternative aspect of the invention provides a catalysed carrier/transfer substrate comprising a carrier/transfer substrate and a catalyst layer of the invention. The carrier/transfer substrate is intended to be removed from the layer in a subsequent step. For example, the catalyst layer may be transferred, by decal transfer, to a gas diffusion layer or ion-conducting membrane, the carrier/transfer substrate being removed immediately after, or at some point subsequent to, the transfer process.

Additional layers may be deposited on the exposed face of the catalyst layer prior to removal of the carrier/transfer substrate; for example, an ion-conducting ionomer layer may be applied from a dispersion of ionomer using any suitable deposition technique known as described above in relation to deposition of the catalyst layer. Further additional layers can be added as required, for example as described in UK Patent Application No. 1405210.4. The carrier/transfer substrate is removed from the catalyst layer at an appropriate time. The carrier/transfer substrate may be formed from any suitable material from which the catalyst layer can be removed without damage thereto. Examples of suitable materials include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene) and polyolefins, such as biaxially oriented polypropylene (BOPP).

The invention further provides an MEA comprising a catalyst layer, a gas diffusion electrode or a catalysed membrane of the invention and an electrochemical device, such as a fuel cell, comprising a MEA, catalyst layer, gas diffusion electrode or catalysed membrane of the invention.

Although the invention is described with reference to its use in a PEMFC, it can be understood that the catalyst layer of the invention will have application in other types of fuel cells where the properties of the inventive catalyst can lead to improved fuel cell performance and/or stability. In addition, the catalyst of the invention may find application in other electrochemical devices, and in particular in water electrolysis cells where the oxygen evolution reaction is the primary reaction at the anode. In addition, the catalyst of the invention may find application in non-electrochemical devices.

The invention will be further described with reference to the following examples which are illustrative and not limiting of the invention.

General Preparation Method for Examples 1 to 3

A particulate carbon black supported nanoparticle platinum (Pt/C) catalyst material precursor was prepared using a method analogous to the general method of preparation of carbon supported platinum catalysts described in WO2013/045894. The Pt/C catalyst was dispersed in 24 wt % aqueous ammonia solution and heated to 60° C. (3-Aminopropyl)triethoxysilane was added and the mixture stirred for one hour. Tetraethylorthosilicate was added and the mixture stirred for a further hour before being allowed to cool to room temperature. The resulting siloxane polymer coated Pt/C catalyst was then filtered, washed with demineralised water and dried.

A solution of nickel nitrate in water was added in aliquots to the dried siloxane-coated Pt/C catalyst and mixed to ensure a homogeneous dispersion. Once deposition was complete the PtNi-siloxane material was recovered, dried and heated in a reducing atmosphere of 5% $H_2/N_2$ first at 350° C. for three hours to convert the siloxane to silica and then in a sequential step the temperature was raised to 900° C. and held for 1 hour to enable alloying of the platinum and nickel components.

The PtNi-silica catalyst was washed in an aqueous solution of tetraethylammonium hydroxide to remove the silica and then in 0.5M $H_2SO_4$ to leach out at least a portion of the Ni; both washing steps were carried out at room temperature for 24 hours.

Example 1

Pt/C catalyst (20.0 g; 5.6 g, 0.0287 mol Pt)
Aqueous ammonia solution (1500 ml)
(3-Aminopropyl)triethoxysilane (3.60 g, 0.016 mol)
Tetraethylorthosilicate (15.26 g, 0.070 mol)
Nickel nitrate (24.96 g; 5.02 g, 0.086 mol Ni) in water (50 ml)
Tetraethylammonium hydroxide (800 ml; 50.66 g, 0.344 mol)
0.5M $H_2SO_4$ (800 ml)

Examples 2 and 3

Pt/C catalyst (50.0 g; 14.0 g, 0.0718 mol Pt)
Aqueous ammonia solution (3000 ml)
(3-Aminopropyl)triethoxysilane (9.00 g, 0.040 mol)
Tetraethylorthosilicate (38.15 g, 0.175 mol)
Nickel nitrate (62.40 g; 13.25 g, 0.215 mol Ni) in water (125 ml)
Example 2: using half the PtNi-silica material prepared above
Tetraethylammonium hydroxide (1000 ml; 58.88 g, 0.400 mol)
0.5M $H_2SO_4$ (1000 ml)
Example 3: using a quarter of the PtNi-silica material prepared above
Tetraethylammonium hydroxide (500 ml; 22.00 g, 0.149 mol)
0.5M $H_2SO_4$ (500 ml)

Comparative Example 1

A Pt/C catalyst (8.0 g; 2.2 g, 0.0115 mol Pt) was prepared using a method analogous to the general method of preparation of carbon supported platinum catalyst described in WO2013/045894. A solution of nickel nitrate (9.98 g; 2.00 g, 0.0345 mol Ni) in water (20 ml) was added in aliquots to the dried Pt/C catalyst and mixed to ensure a homogeneous dispersion. Once deposition was complete the PtNi catalyst was recovered, dried and annealed in a reducing atmosphere of 5% $H_2/N_2$ at 900° C. for 1 hour. The PtNi alloy catalyst was washed in 400 ml of an aqueous solution of tetraethylammonium hydroxide (20.26 g, 0.137 mol) (to replicate the same synthesis steps as undertaken for the Exemplary catalysts) and then in 400 ml of 0.5 M $H_2SO_4$ at room temperature for 24 hours to leach out at least a portion of the Ni.

Comparative Example 2

Comparative Example 2 was prepared following a similar procedure to that described above for Examples 1 to 3, with the exception that the PtNi-silica catalyst material was not washed in tetraethylammonium hydroxide.

Pt/C catalyst (10.0 g; 2.8 g, 0.0143 mol Pt)
Aqueous ammonia solution (25 wt %; 800 ml)
(3-Aminopropyl)triethoxysilane (0.18 g, 0.0008 mol)
Tetraethylorthosilicate (0.763 g, 0.0035 mol)
Nickel nitrate (12.48 g; 2.51 g, 0.043 mol Ni) in water (25 ml)
0.5M $H_2SO_4$ (400 ml)

Comparative Example 3

Comparative Example 3 was prepared using a similar procedure to that described for Comparative Example 1, with the exception that the annealing temperature was 1000° C. and a quarter of the prepared PtNi catalyst material was washed in 1M $HNO_3$ at 70° C. for 72 hours rather than in 0.5M $H_2SO_4$.

Pt/C catalyst (200.0 g; 56.0 g, 0.287 mol Pt)
Nickel nitrate (249.6 g; 50.2 g, 0.86 mol Ni) in water (450 ml)
1M $HNO_3$ (1800 ml)

Example 4 and Comparative Example 4

A Pt/C catalyst (40.0 g; 16.0 g, 0.0820 mol Pt) was prepared using a method analogous to the general method of preparation of carbon supported platinum catalyst described in WO2013/045894. The Pt/C catalyst was dispersed in demineralised water (1000 ml) and the slurry heated to 60° C. and an aqueous solution of rhodium trichloride (20.86 g, 8.44 g Rh, 0.82 mmol) (500 ml) added concurrently with a solution of 1M NaOH to maintain the pH between 5.0 and 7.0 (final pH). Stirring was continued until the hydrolysis was complete and the PtRh catalyst recovered by filtration and washed on the filter bed.

To prepare Example 4, half the PtRh catalyst prepared above was dispersed in 2000 ml of 24 wt % aqueous ammonia solution and heated to 60° C. (3-Aminopropyl)triethoxysilane (4.50 g, 0.020 mol) was added and the mixture stirred for one hour. Tetraethylorthosilicate (19.1 g, 0.088 mol) was added and the mixture stirred for a further hour before being allowed to cool to room temperature. The resulting siloxane polymer coated PtRh/C catalyst was then filtered, washed with demineralised water and dried. A quarter of the resulting siloxane polymer coated PtRh/C catalyst annealed in a reducing atmosphere of 5% $H_2/N_2$, at 500° C. for 1 hour with a slow (1.3° C./min ramp) to first alloy the platinum and rhodium, then form the silicon oxide layer and then improve the PtRh interaction with the carbon support. The PtRh alloy catalyst was washed in 400 ml of an aqueous solution of tetraethylammonium hydroxide (22.8 g, 0.344 mol) to remove the silica.

To prepare Comparative Example 4, an eighth of the PtRh catalyst prepared above was annealed in a reducing atmosphere of 5% $H_2/N_2$, at 500° C. for 1 hour with a slow (1.3° C./min ramp) to alloy the platinum and rhodium and improve the PtRh interaction with the carbon support.

Comparative Example 5

A Pt/C catalyst (100.0 g; 29.7 g, 0.152 mol Pt) was prepared using a method analogous to the general method of preparation of carbon supported platinum catalyst described in WO2013/045894. Once deposition was complete the Pt\C catalyst was recovered, dried and annealed in a reducing atmosphere of 5% $H_2/N_2$ at 1000° C. for 1 hour.

A summary of the catalyst compositions and metal areas is provided in Table 1.

The chemical composition was determined by wet chemical analysis digestion of the sample followed by inductively-couple plasma emission spectroscopy.

The CO chemisorption metal area (COMA) was determined by methods known to those skilled in the art and detailed hereinbefore.

TABLE 1

| | Metal Assay | | | | |
|---|---|---|---|---|---|
| Catalyst | Pt (wt %) | Ni (wt %) | Si (wt %) | COMA ($m^2$/g PGM) | Pt:Ni atomic ratio |
| Example 1 | 29.2 | 3.0 | 0.15 | 60.0 | 3:1 |
| Example 2 | 29.3 | 4.8 | 1.2 | 62.5 | 1.8:1 |
| Example 3 | 27.6 | 4.6 | 3.6 | 67.8 | 1.8:1 |
| Comparative Example 1 | 29.9 | 9.2 | — | 55.2 | 1:1 |
| Comparative Example 2 | 28.3 | 9.3 | 0.20 | 50.2 | 0.9:1 |
| Comparative Example 3 | 28.0 | 3.8 | — | 46.0 | 2.2:1 |
| Comparative Example 5 | 29.7 | — | — | 37.4 | — |

TABLE 2

| | Metal Assay | | | | |
|---|---|---|---|---|---|
| Catalyst | Pt (wt %) | Rh (wt %) | Si (wt %) | COMA ($m^2$/g PGM) | Pt:Rh atomic ratio |
| Example 4 | 31.9 | 13.4 | 0.24 | 40.1 | 1.2:1 |
| Comparative Example 4 | 32.4 | 15.0 | — | 11.8 | 1.2:1 |

Tables 1 and 2 show clear metal surface area gains for PtNi/C and PtRh/C samples heat treated in the presence of deposited $SiO_2$ overlayers. This surface area advantage is seen after removal of the $SiO_2$ layers which might otherwise block catalytically active sites. This result gives clear evidence that the process used in this invention prevents particle sintering during the metal alloying process and this leads to a higher surface area alloy catalyst. This is particularly beneficial when applied to a fuel cell cathode catalyst. Examples of the performance of the PtNi/C samples as cathode catalysts are shown in Table 3. A second advantage of this process is seen for the PtNi/C samples in Table 1 where the use of $SiO_2$ to prevent particle sintering also led to increased selective removal of the less noble metal under acidic conditions.

MEA Fabrication

Catalyst coated membranes (CCM) of 50 $cm^2$ active area were prepared by forming anode and cathode catalyst layers onto a PTFE sheet and transferring the appropriate layers to either side of a PFSA reinforced membrane (20 μm thickness) at a temperature of between 150° C. to 200° C. The Pt/Ni catalyst Examples of the invention and Comparative Examples, as shown in Table 1, were used to form the cathode catalyst layer; the anode catalyst layer in each CCM comprised a commercially available anode catalyst (HiSPEC® 9100 with a nominal Pt loading of 60 wt % Pt on the carbon support) at a loading of 0.1 mgPt/$cm^2$.

A summary of the CCM formulations and cathode Pt loadings is provided in Table 3.

A gas diffusion layer was applied to each face of each CCM to form the complete MEA. The gas diffusion layer used was a carbon fibre paper with a hydrophobic microporous layer containing PFSA ionomer, carbon and PTFE applied to the face in contact with the CCM.

Catalyst Mass Activity Measurement

The catalyst kinetic mass activity was measured on the 50 cm² MEAs with pure hydrogen and oxygen as the anode and cathode reactants respectively $H_2/O_2$ at 80° C. under fully humidified and pressurised anode and cathode (100% RH, 50 kPa$_{gauge}$) conditions. The catalyst mass activity, shown in Table 3, was calculated by measuring the internal resistance (iR) corrected current at 0.9 V and normalised by the mass of platinum in the cathode catalyst layer.

MEA Performance Testing

The polarisation (current vs voltage) performance of the 50 cm² MEAs were measured in $H_2$/air at 80° C. under fully humidified and pressurised cathode (100% RH, 100 kPa$_{gauge}$) reduced humidification cathode (30% RH, 50 kPa$_{gauge}$) conditions. In all measurements, the cell humidity (RH) and pressure was controlled at the anode and cathode inlets. The cell voltage performance results at 1.6 A/cm² (fully humidified conditions) and 1.0 A/cm² (reduced RH conditions) are summarised in Table 3.

TABLE 3

| Cathode catalyst | Cathode catalyst | Cathode catalyst loading (mgPt/cm²) | Mass Activity 100% RH $H_2/O_2$ (A/mgPt)@ 0.9 V | 100% RH $H_2$/Air E@ 1.6 A/cm² | 30% RH $H_2$/Air, E@ 1.0 A/cm² |
|---|---|---|---|---|---|
| CCM 1 | Example 1 | 0.110 | 0.54 | 0.59 | 0.52 |
| CCM 2 | Example 2 | 0.114 | 0.55 | 0.52 | 0.42 |
| CCM 3 | Example 3 | 0.114 | 0.59 | 0.48 | 0.46 |
| Comparative CCM 1 | Comparative Example 1 | 0.120 | 0.65 | 0.40 | <0.3 |
| Comparative CCM 2 | Comparative Example 2 | 0.129 | 0.58 | 0.38 | <0.3 |
| Comparative CCM 3 | Comparative Example 3 | 0.100 | 0.57 | 0.54 | 0.41 |
| Comparative CCM 4 | Comparative Example 5 | 0.091 | 0.17 | <0.3 | <0.3 |

As can be seen, the mass activity (A/mgPt), measured under $H_2/O_2$, of CCMs 1, 2 and 3 shown in Table 3 range between (0.54 to 0.59) A/mgPt. This result shows that the CCMs made with catalysts of the invention have comparable mass activity to the Comparative CCMs 1 to 3 and considerably greater mass activity compared to Comparative CCM 4 which comprises the non-alloyed Pt/C catalyst. The benefit of the catalysts of the invention is particularly seen in the MEA performance testing on Hz/air, particularly at high current density under humidified (100% RH) and reduced RH conditions (30% RH). Table 3 shows that the performance under Hz/air for CCMs 1, 2 and 3 is higher than Comparative CCM 1, which had undergone the same base and acid treatments, showing the beneficial effect is not due to the effect of these treatments on the catalyst support. The performance under these conditions is also higher than Comparative CCM 2 where a low level of $SiO_2$ was added to the catalyst, with no treatment to remove it, showing the performance benefit is therefore not due solely to the presence of low levels of $SiO_2$. Performance is particularly high for CCM 1 containing the catalyst with lowest Si content, thus demonstrating the advantage of the subsequent removal of the $SiO_2$ overlayers formed during the initial heat treatment step. CCM 1 shows higher performance under all conditions even when compared to Comparative CCM 3 where a higher temperature treatment and longer leaching under more acidic conditions has been used to maximise the surface Pt enrichment of the particles. It is worth noting that the performance benefits are especially high at lower humidity, i.e. 30% RH, when compared to the Comparative CCMs. Therefore, the results provide strong evidence that the performance benefit for the catalysts shown in this invention is due to their higher surface area of the active catalyst metal, achieved with the addition of Si during the process for preparation of the catalysts.

What is claimed:

1. A process for preparing a catalyst material, said catalyst material comprising a support material, a first metal and one or more second metals, wherein the first metal and the second metal(s) are alloyed and wherein the first metal is a platinum group metal and the second metal(s) is selected from the group of transition metals and tin provided the second metal(s) is different to the first metal, said process comprising the steps:
    (i) providing a catalyst material precursor comprising the first metal supported on the support material;
    (ii) depositing a silicon oxide precursor and one or more second metal precursors on the catalyst material precursor;
    (iii) carrying out a first heat treatment step to convert the silicon oxide precursor to silicon oxide;
    (iv) carrying out a second heat treatment step to alloy the first metal and the second metal(s); and
    (v) removing at least some of the silicon oxide to give the catalyst material.

2. The process according to claim 1, wherein in step (ii) the silicon oxide precursor is deposited prior to the second metal precursor(s).

3. The process according to claim 1, wherein in step (ii) the second metal precursor(s) is deposited prior to the silicon oxide precursor.

4. The process according to claim 1, wherein the catalyst material comprises two or more second metals and wherein in step (ii) each second metal precursor is independently deposited either before or after the silicon oxide precursor.

5. The process according to claim 1, further comprising step (vi):
    (vi) removal of some or all unalloyed second metal(s) and/or removal of a portion of alloyed second metal(s) from the surface of the catalyst material.

6. The process according to claim 1, wherein the first heat treatment step is carried out at a temperature in the range of 250° C. to 500° C.

7. The process according to claim 1, wherein the second heat treatment step is carried out at a temperature in the range of 350° C. to 1000° C.

8. The process according to claim 1, wherein the first and second heat treatment steps are carried out as a single sequential process, the second heat treatment step being a continuation of the first heat treatment step.

9. The process according to claim 1, wherein the first metal is platinum.

10. The process according to claim 1, wherein the second metal(s) is one or more metals selected from the group consisting of precious metals other than platinum and base metals.

11. The process according to claim 10, wherein the second metal(s) is selected from the group consisting of ruthenium, rhodium, palladium, osmium, iridium, gold, silver, nickel, cobalt, chromium, copper, iron, zinc, niobium, tantalum, vanadium, tin or titanium.

12. The process according to claim 11, wherein second metal(s) is selected from the group consisting of nickel, cobalt, chromium, palladium, iridium, copper, iron zinc, osmium, ruthenium, niobium, tantalum, vanadium, tin, titanium and rhodium.

13. The process according to claim 12, wherein the second metal(s) is selected from the group consisting of nickel, cobalt, chromium, palladium, iridium, copper, iron or zinc.

14. The process according to claim 12, wherein the second metal(s) is selected from the group consisting of osmium, ruthenium, niobium, tantalum, vanadium, iridium, tin, titanium or rhodium.

15. The process according to claim 1, wherein up to 5 wt % of silicon with respect to the weight of the catalyst material remains after step (v).

16. The catalyst material obtained by the process according to claim 1.

17. A cathode catalyst material comprising a support material, a first metal and one or more second metals, wherein the first metal and the second metal(s) are alloyed and wherein the first metal is a platinum group metal and the second metal(s) is selected from the group consisting of nickel, cobalt, chromium, palladium, iridium, copper, iron or zinc, provided the first metal and second metal(s) are not the same, characterised in that the atomic ratio of first metal to total second metal(s) is ≥1, and the CO metal area of the cathode catalyst material, as measured by gas phase carbon monoxide (CO) chemisorption, is at least 56 $m^2/g$ of the platinum group metal components.

18. An anode catalyst material comprising a support material, a first metal and one or more second metal(s), wherein the first metal and the second metal(s) are alloyed and wherein the first metal is a platinum group metal and the second metal(s) is selected from the group consisting of osmium ruthenium, niobium tantalum, vanadium iridium tin titanium or rhodium, provided that the first metal and the second metal(s) are not the same, characterised in that the atomic ratio of first metal to total second metal(s) is ≥0.5 and the CO metal area of the anode catalyst material, as measured by gas phase carbon monoxide (CO) chemisorption, is at least 18 $m^2/g$ of platinum group metal components.

19. A catalyst layer comprising a cathode catalyst material according to claim 17.

20. A cathode catalyst material according to claim 17, wherein the first metal is platinum, ruthenium, rhodium, osmium or iridium.

21. A cathode catalyst material according to claim 20, wherein the first metal is platinum.

22. A cathode catalyst material according to claim 17, wherein the second metal(s) is selected from the group consisting of nickel, cobalt, chromium, iridium, copper, iron, or zinc.

23. A cathode catalyst material according to claim 22, wherein the second metal is nickel.

24. An anode catalyst material according to claim 18, wherein the first metal is platinum, ruthenium, rhodium, osmium, or iridium.

25. An anode catalyst material according to claim 24, wherein the first metal is platinum.

26. An anode catalyst material according to claim 18, wherein the second metal is rhodium.

27. A catalyst layer comprising an anode catalyst material according to claim 18.

* * * * *